United States Patent
Beming et al.

(10) Patent No.: US 6,628,942 B1
(45) Date of Patent: Sep. 30, 2003

(54) METHOD AND APPARATUS FOR PAGING AND RESPONDING TO PAGES IN A MOBILE RADIO COMMUNICATIONS SYSTEM

(75) Inventors: Per Beming, Stockholm (SE); Ingrid Nordstrand, Sundbyberg (SE); Walter Müller, Upplands-Väsby (SE); Håkan Palm, Lund (SE); Pontus Wallentin, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/413,487

(22) Filed: Oct. 6, 1999

(51) Int. Cl.[7] ................................................ H04Q 7/20
(52) U.S. Cl. ....................................... 455/432; 455/458
(58) Field of Search ................................ 455/426, 432, 455/435, 445, 458, 517; 340/7.22

(56) References Cited

U.S. PATENT DOCUMENTS

| | | | |
|---|---|---|---|
| 5,276,911 A | * | 1/1994 | Levine et al. ................. 455/450 |
| 5,319,699 A | | 6/1994 | Kerihuel et al. |
| 5,381,464 A | | 1/1995 | Shelhamer et al. |
| 5,574,975 A | * | 11/1996 | Hill |
| 5,722,073 A | * | 2/1998 | Wallstedt et al. ............. 455/436 |
| 5,842,210 A | * | 11/1998 | Chen et al. |
| 5,915,225 A | * | 6/1999 | Mills ............................ 455/558 |
| 5,960,356 A | * | 9/1999 | Alperovich et al. .......... 455/432 |
| 6,292,667 B1 | * | 9/2001 | Wallentin et al. ............ 455/435 |

FOREIGN PATENT DOCUMENTS

| WO | 98/24249 | 6/1998 |
|---|---|---|

* cited by examiner

Primary Examiner—Nguyen T. Vo
(74) Attorney, Agent, or Firm—Nixon & Vanderhye, P.C.

(57) ABSTRACT

A paging origination identifier associated with an origination of a page to a mobile radio terminal is included with a mobile terminal's response to the page. For example, assuming that the page to the mobile terminal is in a first area, the mobile terminal responds to the page from a second area and includes the identifier in that response. The second area may be a cell controlled by another radio network control node, another radio network operator, or even another type of cellular system. The identifier is used to route the page response through the radio network ultimately to the paging originator. The identifier may be, for example, a paging area identifier, a registration area identifier, or a network exchange identifier. Another example identifier is the cell where the mobile terminal received the page. Cell evaluation and selection processes need only be performed while the mobile terminal is listening to the paging channel, for example, thereby saving mobile terminal battery life. Since the mobile terminal checks for an optimum cell just before it transmits a paging response, it ensures that the optimum cell is used, thereby improving the quality of the communication. As a result, there is less chance of increased interference caused by the uplink transmission, of a lost connection, or of an error in the message.

37 Claims, 9 Drawing Sheets

METHOD AND APPARATUS FOR PAGING AND RESPONDING TO PAGES IN A MOBILE RADIO COMMUNICATIONS SYSTEM

RELATED APPLICATIONS

This patent application is related to commonly assigned U.S. patent application Ser. No. 09/071,886, filed May 5, 1998, entitled "Multicell Area Paging for Cellular Communication System" and U.S. patent application Ser. No. 09/258,151, filed Feb. 26, 1999, and entitled "Method and Apparatus for Transferring Information Between Mobile Terminals and Entities in a Radio Access Network." These disclosures are incorporated herein by reference.

FIELD OF THE INVENTION

The present invention finds application to cellular communications and relates to mobile terminal responses to pages in a mobile communications system.

BACKGROUND OF THE INVENTION

A cellular telephone is one example of what is generally characterized as a "mobile station" (MS), a "mobile terminal" (MT), or even more generally as "user equipment" (UE). The term mobile terminal is employed hereafter for purposes of description. Telecommunications services are provided between a cellular telecommunications network and a mobile terminal over an air interface, e.g., over radio frequencies. An active mobile terminal communicates over the air interface with one or more base stations. The base stations are managed by base station controllers (BSCs), which in some systems, are known as radio network controllers (RNCs). The term RNC is employed hereafter for purposes of description. Radio network controllers are coupled to one or more telecommunications networks by way of one or more control nodes such as a mobile switching center (MSC) node for connecting to connection-oriented, circuit-switched networks such as PSTN and/or ISDN, and a general packet radio service.(e.g., GPRS) node for connecting to connectionless, packet-switched networks such as the Internet.

A simplified cellular communications system is shown in function block format in FIG. 1. An example core network is connected to several radio network controllers (RNC) including RNC1, RNC2, and RNC3. Each RNC controls the allocation of radio resources and radio connectivity operations for a set of cells: RNC1 controls cells 1:1–1:5, RNC2 controls cells 2:1–2:5, and RNC3 controls cells 3:1–3:5. The RNCs communicate by way of a signaling network, e.g., signaling system number 7 (SS7), and a transport network. Each cell is a geographical area where radio coverage is provided by radio base station equipment at the base station site. A base station may serve one or more cells. A "handover" occurs as a mobile terminal travels from an old cell to a new cell which permits mobile terminals to "roam" considerable distances. Each cell is identified using a unique identity broadcast in that cell over a common broadcast channel.

As indicated in FIG. 1, the RNCs, the interconnecting signaling and transport network, and the radio base station equipment in each of the cells together comprise a radio access network (RAN). Mobile terminals (MTs) permit a subscriber access to telecommunications services offered by the core network via the RAN. The radio access network controls radio connections and transmissions between the core network and the mobile terminals.

Different roles may be assigned to RNCs in the RAN depending on circumstances, configurations, etc. One RNC role is that of a "controlling" RNC (CRNC) which controls the radio resources in its set of cells. In the example shown in FIG. 1, the RNC1 is the controlling RNC for cells 1:1 to 1:5, the RNC2 is the controlling RNC for cells 2:1 to 2:5, and the RNC3 is the controlling RNC for cells 3:1 to 3:5.

FIG. 2 shows adjacent cells in a cellular communications network. An active cell denotes the cell currently supporting a radio connection with a mobile terminal. Adjacent neighboring cells may be selected by the mobile terminal via forward handover to support the connection. Forward handover or cell reselection is a process where a mobile terminal itself continues an established connection between a core network and the mobile terminal as the mobile terminal moves between different cells in the radio access network. Contrasted with traditional handover, the mobile terminal in forward handover independently re-establishes the radio connection with a new cell. This re-establishment of the connection is performed without prior notification via the old cell. Nor is there advance preparation in the network to continue the communication via the new cell. It is the mobile terminal that initiates and orchestrates forward handover rather than the core network, the core network node (e.g., an MSC), or the radio access network (RAN).

FIG. 3 illustrates an example where cells controlled by RNC1–RNC3 are grouped into registration areas, RA1–RA6, each consisting of one or several cells. Information transmitted on the broadcast channel in each cell may contain cell and registration area identifiers for purposes of registration control. As long as such cell and registration area identifiers broadcast by a specific cell contain the same cell and registration area identifiers assigned to the mobile terminal during the most recent cell or RA update procedure, the mobile terminal need not register. However, when the terminal mobile terminal does not recognize the broadcast cell and registration area identifiers in the cell, it initiates an RA update procedure.

To reach a mobile terminal, the radio network initiates a paging procedure. More specifically, a paging message containing the mobile terminal identity is transmit on a paging channel. In order for the paging message to be directed to an area where the mobile terminal is located, the radio network stores in memory, determines the current location of the mobile station either on a cell level, on a registration area level, or on some other level. The page is then transmitted in a paging area which may, for example (although not necessarily), be identical to the registration cell or a registration area. Another example paging area may correspond to cells 1:1–1:5 associated with RNC1 as shown in FIG.1.

When the mobile terminal listens to the paging channel in its current cell, it may be decide to change to another cell using a cell reselection process as a result of changed radio conditions. More specifically, another cell may have better, current radio conditions for communication for that mobile terminal. The cell reselection may be decided based on one or more cell selection evaluation criteria. For example in a CDMA based system, the mobile terminal listening for pages need only be concerned about the quality of the downlink transmission from the base station in the current cell. On the other hand, if the mobile terminal must respond to the page, it must consider the uplink radio conditions over which it must transmit in that cell. The uplink conditions may not be optimal, meaning that the mobile would have to transmit at a higher power than it would from a more optimal cell. In this example, the mobile may select the more optimum cell before it transmits a response to the page. If the mobile terminal changes its current cell, the new cell may belong to a new registration area. Normally, this would trigger a registration procedure.

Balancing the desire to select the most optimal cell, e.g., to find and select the cell with the best uplink and downlink radio conditions, is the need to conserve battery power of the mobile terminal. Therefore, the mobile terminal may limit cell selection evaluation to certain time periods such as only when the mobile terminal is listening to the paging channel. Otherwise, the mobile terminal must use precious battery power to perform the cell reselection evaluation process at another time separate from the time it is powered up to listen to the paging channel.

The mobile terminal responds to a page by sending a paging response message to the radio network. Traditionally, the mobile terminal responds to the paging message in the same cell where it received that paging message. However, because the mobile terminal is listening to the paging channel, it may also be evaluating whether the current cell is the optimum cell, e.g., for uplink transmission in response to the page in a CDMA-based system, before responding to the page. If the mobile terminal happens to select another, more optimum cell and send a paging response message to that new cell, that message may not be routed to the paging originator. For example, if the newly selected cell belongs to a different RNC than the RNC that originated the page, the paging response may not find its way back to the page originating RNC or the page originating, external core network. Furthermore, the new cell might belong to another network operator, or even another type of cellular system, e.g., GSM instead of wideband CDMA. The result is a significant number of "unsolicited" paging responses that are not recognized by the receiving radio network control node, and therefore, are not directed to the paging originator. In second generation mobile communication systems, such as GSM, this situation is avoided by prohibiting a mobile terminal from responding to a page from a cell outside the registration area where it is registered. But this prohibition greatly restricts the flexibility and coverage area of the radio network.

It is similarly possible to constrain the mobile terminal so that it only responds to the page in the cell where it received the page. However, the mobile terminal may be forced to remain on a non-optimal cell with poor radio conditions, possibly resulting in erroneously received or transmitted messages. The mobile terminal would need to monitor the uplink and downlink conditions of its current and neighboring cells to determine and select the optimum cell at times other than when receiving a page. This may be acceptable if such evaluations occur frequently, but at the cost of increased battery loss at the mobile terminal resulting from those frequent evaluations. Furthermore, even with increased evaluation periods, the radio conditions may be changing rapidly so that there is a possibility that the radio conditions may have changed for the worse by the time the mobile terminal is listening/responding to a page.

The present invention solves these problems by providing a mechanism to efficiently and reliably route a paging response from a mobile terminal to the page originator— even if the mobile terminal has selected a new, more optimum cell just before responding to the page. As a result, the cell evaluation and selection process need only be performed while the mobile is listening to the paging channel, thereby saving mobile terminal battery life. Since the mobile terminal checks for the optimum cell just before it transmits a paging response, there is less chance of increased interference caused by the uplink transmission, of a lost connection, or of an error in the message.

A paging origination identifier is associated with an origination of a page to a mobile radio terminal. The mobile terminal responds to the page using the identifier. For example, assuming that the page to the mobile terminal is in a first area, the mobile terminal responds to the page from a second area and includes the identifier in that response. The paging response may be part of an initial random access message or included with a paging access message sent by the mobile terminal after a connection is made with the radio network. The identifier is used to route the page response through the radio network ultimately to the paging originator. Various example routing embodiments using the identifier in a paging response from the mobile terminal are described below. The identifier may be for example a paging area identifier, a registration area identifier, or a network exchange identifier and may be included in the page. Alternatively, the identifier need not be included with the page. An example identifier in this situation is the cell identity where the mobile terminal received the page.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts throughout. While individual functional blocks are shown in many of the figures, those skilled in the art will appreciate these functions may be performed by individual hardware circuits, by a suitably programmed digital microprocessor or general purpose computer, by an application specific integrated circuit (ASIC), and/or by one or more digital signaling processors (DSPs).

DETAILED DESCRIPTION OF THE DRAWINGS

In the following description, for purposes of explanation and not limitation, specific details are set forth, such as particular embodiments, network architectures, signaling flows, protocols, techniques, etc., in order to provide an understanding of the present invention. However, it will be apparent to one skilled in the art that the present invention may be practiced in other embodiments that depart from these specific details. For example, the present invention is sometimes disclosed in the example context of radio access networks having radio network control node in a wideband-CDMA based mobile radio communications system. However, those skilled in the art will appreciate the present invention can be applied to other types of mobile radio systems and radio networks. In other instances, detailed descriptions of well-known methods, interfaces, devices, protocols, and signaling techniques are omitted so as not to obscure the description of the present invention with unnecessary detail.

Figure 1:
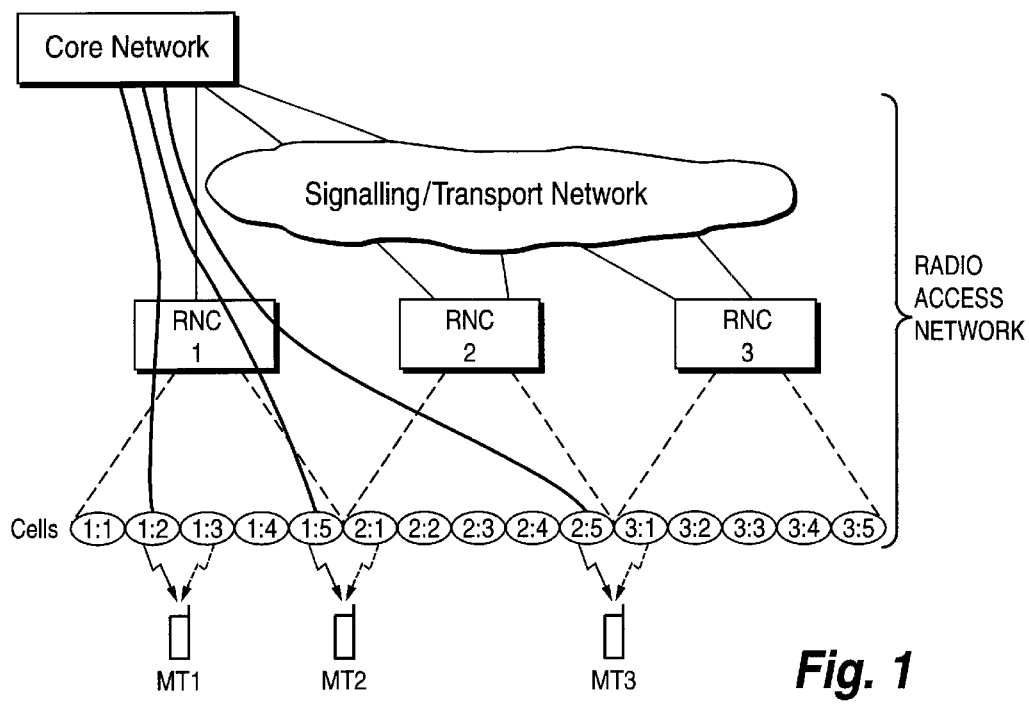
FIG. 1 is a simplified function block diagram of a radio communications system with a radio access network.
Figure 2:
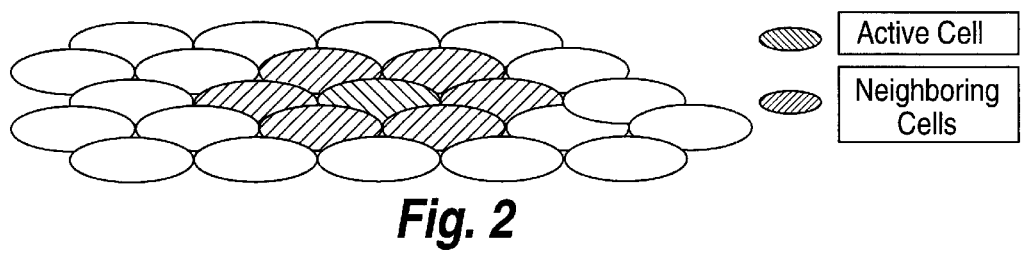
FIG. 2 is a diagram illustrating conceptually a cellular radio network identifying active cells surrounded by neighboring cells.
Figure 3:
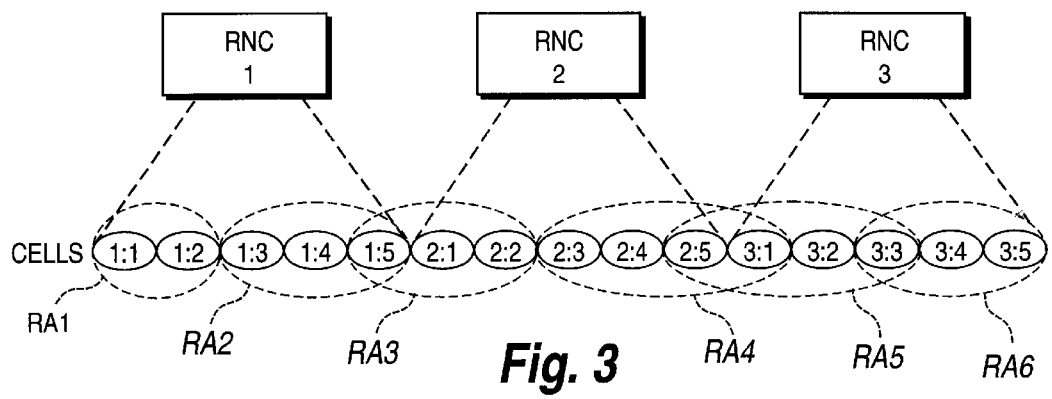
FIG. 3 illustrates example registration areas.
Figure 4:
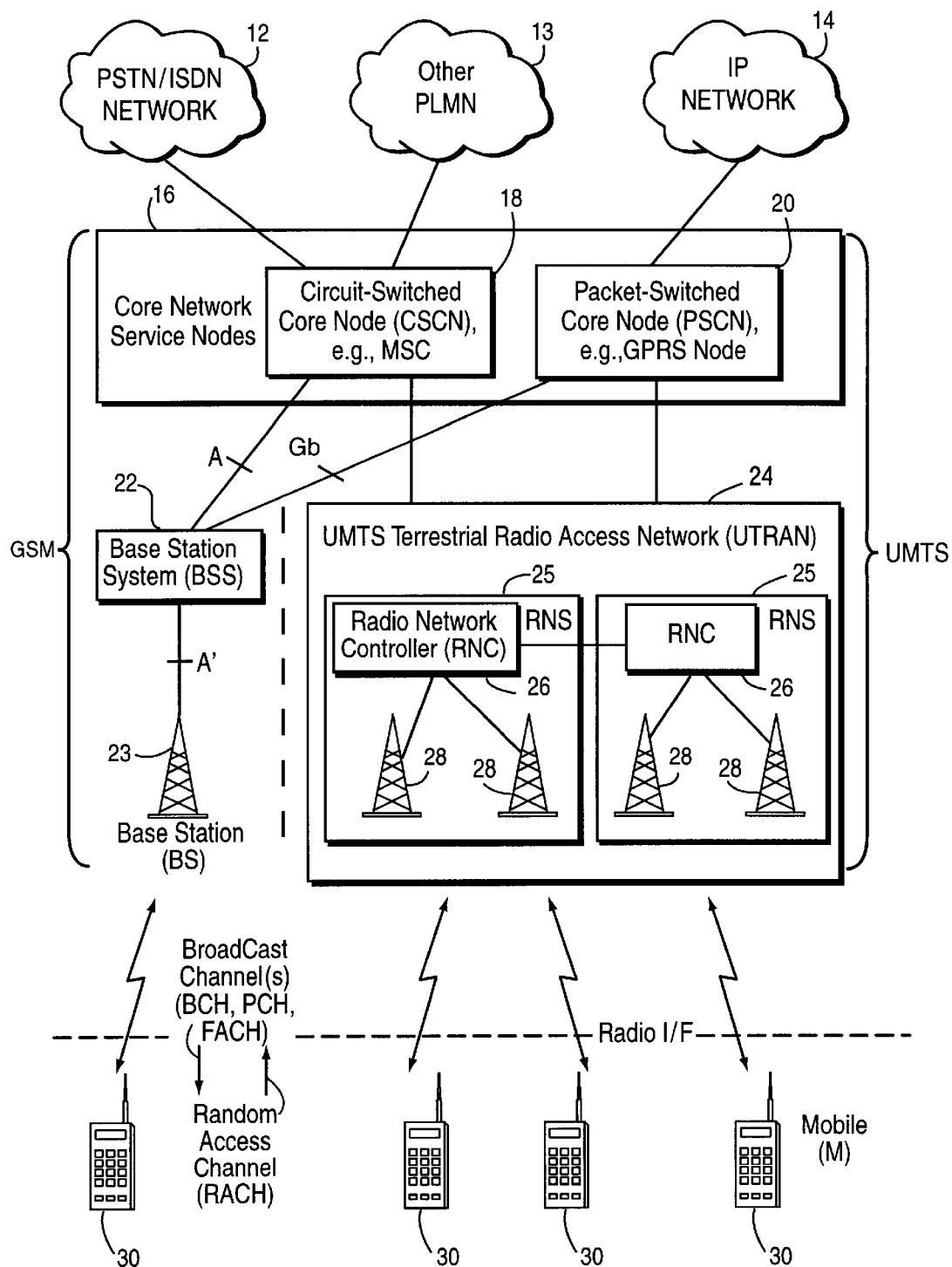
FIG. 4 is a function block diagram of a mobile communications system including both a wideband CDMA-based universal mobile telephone system (UMTS) and a Global System for Mobile Communication system (GSM)

The present invention may be applied in any mobile communications system including that shown in FIG. 1 described earlier. Another non-limiting example is the mobile communications system shown in FIG. 4 now described. A representative, circuit-switched, external core network, shown as a cloud 12 may be for example the public switched telephone network (PSTN) and/or the integrated services digital network (ISDN). Another circuit-switched, external core network may correspond to another Public Land Mobile radio Network (PLMN) 13. A representative, packet-switched, external core network shown as cloud 14 may be for example an IP network such as the Internet. The core networks are coupled to corresponding network service nodes 16. The PSTN/ISDN network 12 and other PLMN network 13 are connected to a circuit-switched core node (CSCN), such as a Mobile Switching Center (MSC), that provides circuit-switched services.

Each of the core network service nodes 18 and 20 is part of an existing second generation type of mobile communications system like the Global System for Mobile Communications (GSM). In GSM, the MSC 18 is connected over an interface A to a GSM base station subsystem (BSS) 22 which in turn is connected to a radio base station 23 over an interface A'. The packet-switched network 14 is connected to a packet-switched core node (PSCN), e.g., a GSM Packet Radio Service (GPRS) node 20 tailored to provide packet-switched type services in the context of GSM which is sometimes referred to as the Serving GPRS Service Node (SGSN). The GPRS node is connected to the GSM BSS 22 over an interface Gb.

Each of the core network service nodes 18 and 20 is also part of a third generation, Universal Mobile Telecommunications System (UMTS). In UMTS, the core network service nodes 18 and 20 are coupled to a UMTS terrestrial radio access network (UTRAN) 24 over a radio access network interface. The UTRAN 24 includes one or more radio network systems (RNS) 25 each with a radio network controller (RNC) 26 coupled to a plurality of base stations (BS) 28 and to the RNCs in the UTRAN 24.

Radio access over GSM is based upon the well known time division multiple access (TDMA) principle where time slot channels are time multiplexed on various frequencies. Radio access over the UMTS radio interface is based upon wideband, Code Division Multiple Access (WCDMA) with individual radio channels allocated using CDMA channelization or spreading codes. Of course, other access methods may be employed. WCDMA provides wide bandwidth for multimedia services and other high transmission rate demands as well as robust features like diversity handoff and RAKE receivers to ensure high quality communication service in a frequently changing environment. Each mobile station is assigned its own scrambling code in order for a base station 28 to identify transmissions from that particular mobile station. The mobile station also uses its own scrambling code to identify transmissions from the base station either on a general broadcast or common channel or transmissions specifically intended for that mobile station. That scrambling code distinguishes the scrambled signal from all of the other transmissions and noise present in the same area.

Different types of control channels are shown bridging the radio interface. For example, in the forward or downlink direction, there are several types of broadcast channels including a general broadcast channel (BCH), a paging channel (PCH), and a forward access channel (FACH) for providing various types of control messages to mobile stations. In the reverse or uplink direction, a random access channel (RACH) is employed by mobile stations whenever access is desired to perform location registration, call origination, page response, and other types of access operations.

Figure 5:
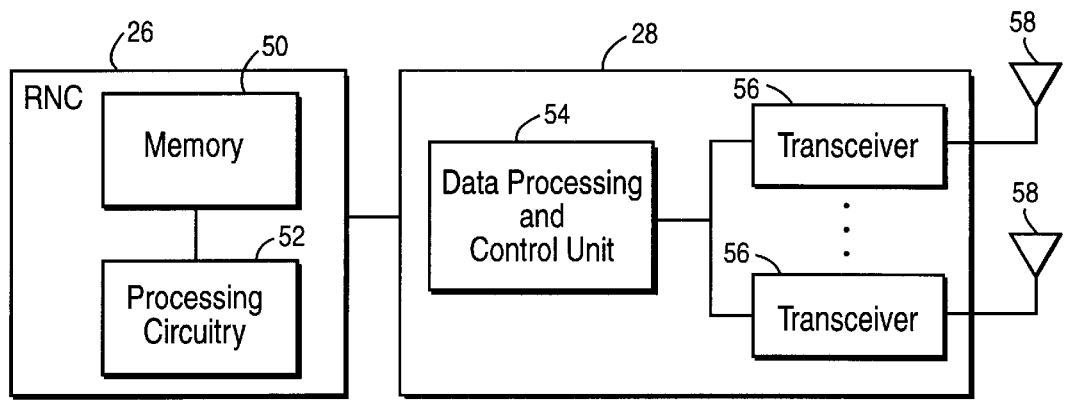
FIG. 5 is a function block diagram of an RNC and a base station shown in FIG. 4.
Figure 6:
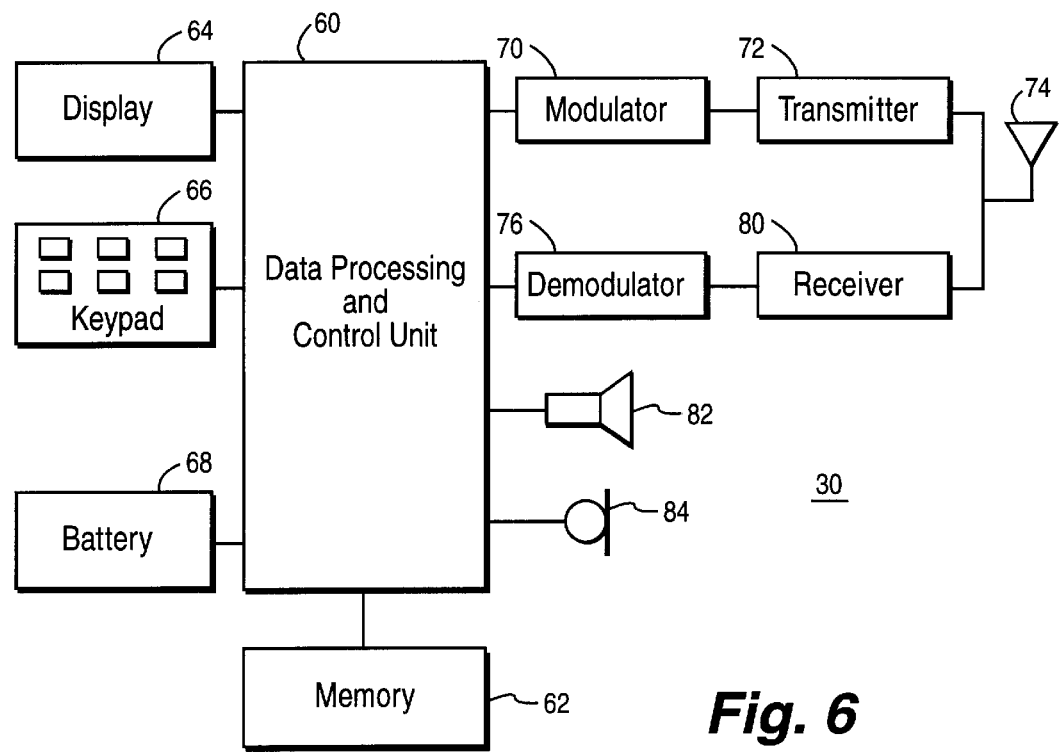
FIG. 6 is function block diagram of a mobile terminal shown in FIG. 4.

Simplified function block diagrams of the radio network controller 26 and base station 28 are shown in FIG. 5. The radio network controller 26 includes a memory 50 coupled to data processing circuitry 52 that performs numerous radio and data processing operations required to perform its control function and conduct communications between the RNC and other entities such as the core network service nodes, other RNCs, and base stations. Data processing circuitry 52 may include any one or a combination of suitably programmed or configured general purpose computer, microprocessor, microcontroller, dedicated logic circuitry, DSP, ASIC, etc., as described above. The base station 28 includes a data processing and control unit 54 which, in addition to performing processing operations relating to communications with the RNC 26, performs a number of measurement and control operations associated with base station radio equipment including transceivers 56 connected to one or more antennas 58.

A simplified function block diagram of a mobile station 30 is shown in FIG. 5. The mobile station 30 includes an antenna 74 for transmitting signals to and for receiving signals from a base station 28. The antenna 74 is coupled to radio transceiving circuitry including a modulator 70 coupled to a transmitter 72 and a demodulator 76 coupled to a receiver 80. The radio transceived signals include signaling information in accordance with an air interface standard (s) applicable to the GSM and wideband CDMA systems shown in FIG. 4. The data processing and control unit 60 and memory 62 include the circuitry required for implementing audio, logic, and control functions of the mobile station. Memory 62 stores both programs and data. Conventional speaker or earphone 82, microphone 84, keypad 66, and display 64 are coupled to the data processing and control unit 60 to make up the user interface. A battery 68 powers the various circuits required to operate the mobile station.

Figure 7:
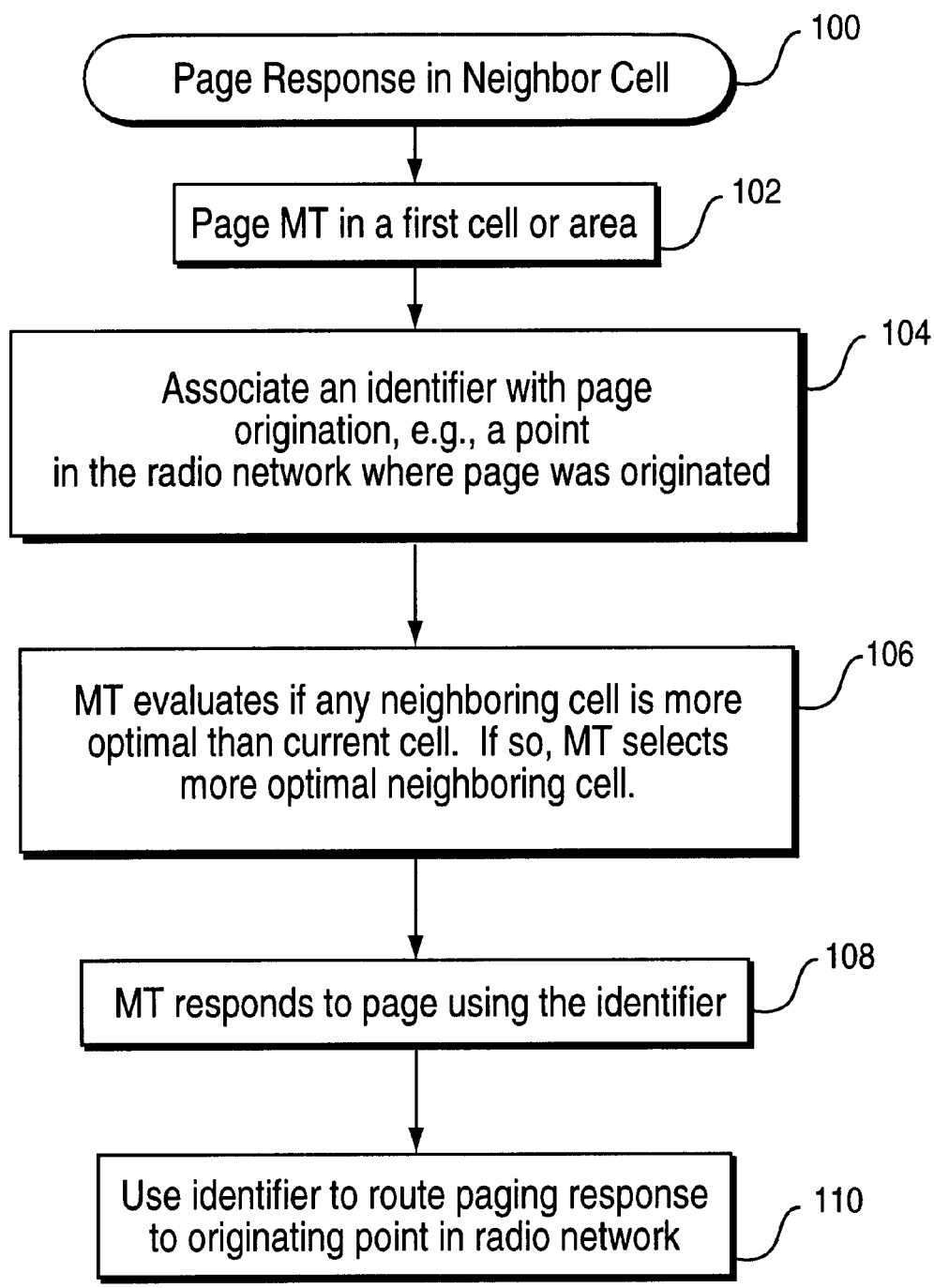
FIG. 7 is a flowchart diagram illustrating a Page Response in Neighbor Cell procedure in accordance with one example embodiment of the present invention.

One example implementation of the invention is now described using the flow chart diagram shown in FIG. 7 identified as Page Response in Neighbor Cell (block 100).

Initially, a mobile terminal is paged in a current cell(s) or area(s) where the mobile is believed to be located (block 102). An identifier, sometimes called a paging origination identifier, is associated with the page and may be included or not included with the page (block 102). The identifier is associated with the originator of the page and can identify some point, port, node, or address in the radio access network where the page originated, for example. In block 106, the mobile terminal evaluates if any neighboring cells is more optimal than the current serving cell. If so, the mobile terminal selects that more optimal cell. The mobile terminal identified in the page responds, (e.g., from anywhere in the radio access network), to the radio access network using the identifier (block 108). If the mobile terminal selected a more optimal neighboring cell, the page response would be transmitted from that newly selected cell rather than from the cell in which the page was received.

The radio access network detects the identifier and uses it to route the paging response of the mobile terminal to the originator of the page, e.g., to the point, port, node, or address in the radio access network where the page originated (block 110). In this way, if the mobile terminal responds to the page from a neighbor cell that is now more optimum than the cell in which the page was received by the mobile terminal, the radio access network(s) is(are) nevertheless able to properly route the paging response by virtue of the identifier. Indeed, the neighboring cells may include cells belonging to other RNCs, other cellular operators, or even other types of radio access systems. For example, when the mobile terminal receives the page via a WCDMA/UTRAN cell, it may be more optimal to respond in a GSM cell.

Figure 8A:
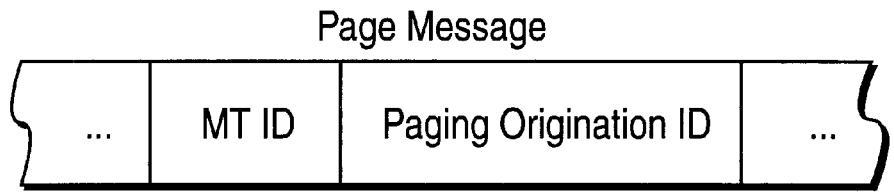
FIGS. 8A–8D illustrate example simplified formats for a paging message, an initial random access message, and a paging response message, respectively, incorporating a paging origination identifier.

FIGS. 8A–8D show non-limiting, example, simplified signal formats that may be used in paging messages and paging responses from the mobile terminal. FIG. 8A illustrates a simplified portion of a paging message including a mobile terminal identifier (MT ID) field as well as a paging origination identifier field. The MT ID is used within the paging originator node to associate the page response with the page. The paging origination identifier could be a paging area identity, a registration area identity, or an RNC identifier or address.

As an alternative to including the paging origination identifier in the page message, a cell ID corresponding to the cell where the mobile terminal received the page may be used as the paging origination identifier. Since the cell ID is broadcast to all mobile terminals in the cell over the cell's broadcast channel, there is no need to include the cell ID in the paging message thereby simplifying implementation of the invention in existing systems since the format of the paging message need not be altered.

Figure 8B:
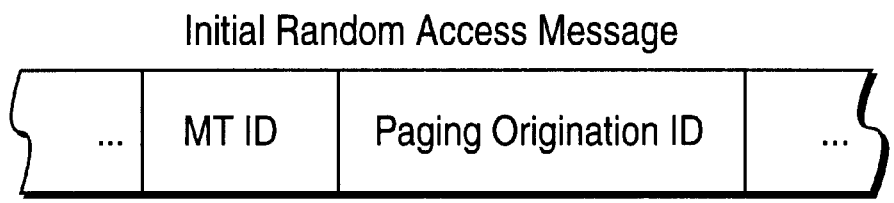

In any paging response signal from the mobile terminal, the paging origination identifier received in the page is included and used by radio network to route the paging response to the paging originator. FIG. 8B illustrates a non-limiting example where the paging response is included in an initial random access message before a connection is established between the mobile terminal and the radio network. The mobile terminal includes the paging origination identifier received in the page or some other broadcast message from the radio network in addition to the usual fields such as an MT ID field. The initial random access message may be received by a base station associated with an RNC A different from the RNC B controlling the base station that transmitted the page received by the mobile terminal. In that case, the contents of the initial random access message are forwarded to the RNC B by RNC A using the paging origination identifier. In this example, the responsibility of the connection with the mobile terminal is the RNC B that transmitted the page to the mobile terminal.

Figure 8C:
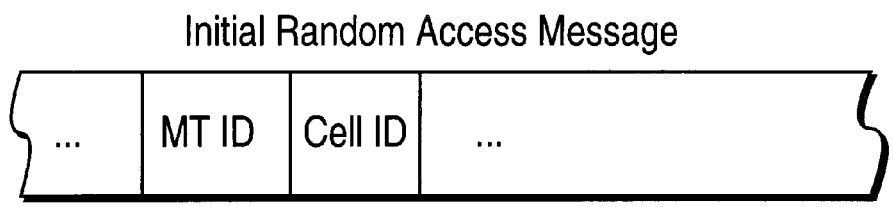

The initial random access message may include the cell ID as well as the usual fields such as MT ID as shown in FIG. 8C. The cell ID refers to the cell where the mobile terminal received the page. The initial random access message may be received by a base station associated with an RNC A different from the RNC B controlling the base station that transmitted the page received by the mobile terminal. In that case, the contents of the initial random access message are forwarded to the RNC B by RNC A using the cell ID.

Figure 8D:
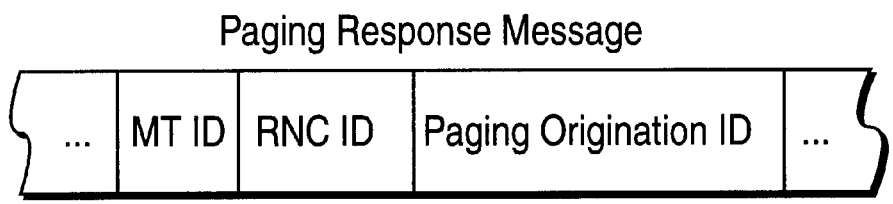

Another example, non-limiting paging response format is a paging response message shown in FIG. 8D transmitted by the mobile station after a connection is established between the mobile terminal and an RNC associated with the cell in which the mobile terminal responds. In other words, the mobile terminal does not include the paging origination identifier in the initial random access message sent back to the radio network. Instead, the initial random access and the connection to the mobile terminal are handled by the RNC associated with the base station receiving the initial random access message, which is not necessarily the same RNC that sent the page. When the connection with the mobile terminal is established, the mobile terminal sends a paging response message that includes the paging origination identifier. This paging response message is then forwarded to the RNC that sent the page.

Figure 9:
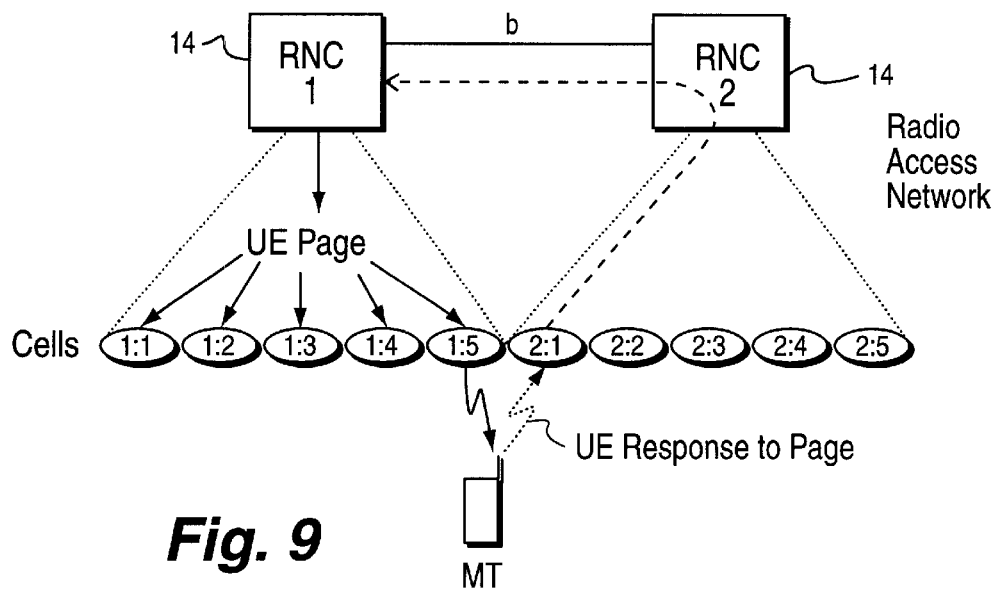
FIG. 9 illustrates an example, non-limiting page/page response scenario in which the present invention is employed.
Figure 10:
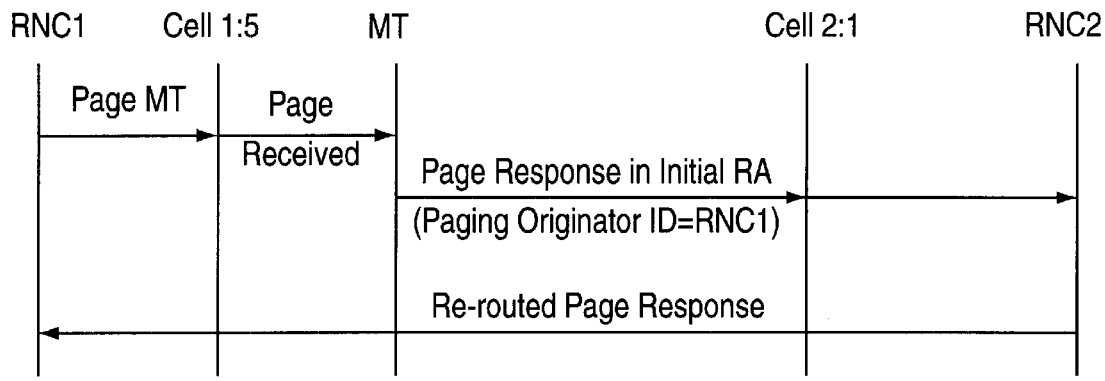
FIGS. 10 and 11 are signaling diagrams illustrating different example implementations of the invention in accordance with the example page/page response scenario of FIG. 9.

FIG. 9 illustrates an example application of the present invention to a scenario where the mobile terminal is at or near the border between cell 1:5 and cell 2:1. Cell 1:5 is controlled by RNC 1, and cell 2:1 is controlled by RNC 2. The two RNCs are coupled together by way of a link b. The mobile terminal MT is paged in all of the cells 1:1–1:5 controlled by RNC 1. So the RNC 1 is associated with the origination of the page. However, the mobile terminal responds to the page in cell 2:1. In this non-limiting example, the address of the RNC 1 is included in the page and serves as the paging origination identifier. As a result of that included paging origination identifier, the paging response in the initial random access message to cell 2:1 is routed to the RNC 1 via link b. FIG. 10 illustrates a simplified signaling diagram where the page is sent to the mobile terminal from RNC 1 to the MT via cell 1:5. The MT sends its response in the initial random access (RA) message to cell 2:1 forwarded to RNC 2 which re-routes that message to RNC 1. Instead of including a paging response in the initial random access message like that shown in FIG. 10, the mobile terminal may include the cell ID of the cell where the mobile terminal received the page message in the initial random access message. In this case, the initial random access message is routed to RNC 1 via RNC 2 using the cell ID.

Figure 11:
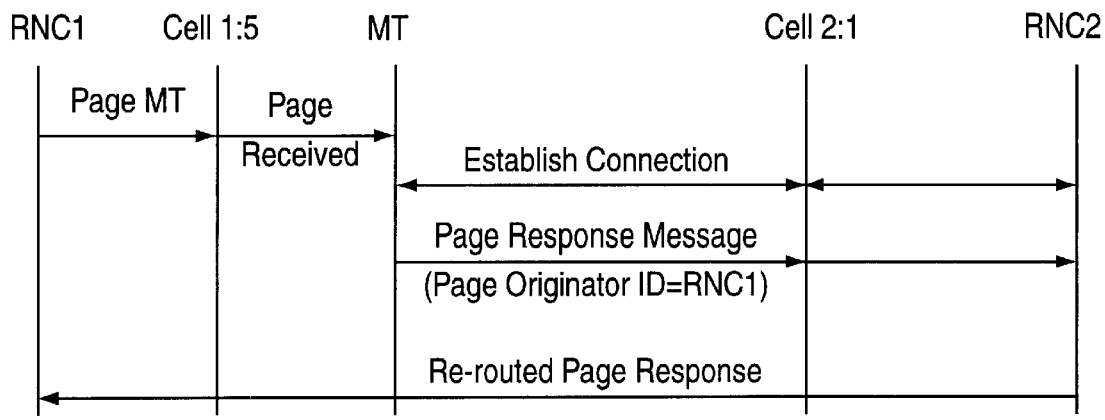

Alternatively, if the mobile terminal does not include the paging origination identifier in the initial random access message, a connection is established between RNC 2 and the mobile terminal. When the connection to the mobile terminal is established, the mobile terminal sends a paging response message including the paging origination identifier identifying RNC 1. Consequently, RNC 2 forwards the paging response message to RNC 1 via link b. FIG. 11 is a simplified signaling diagram for this alternate, example implementation.

Figure 12:
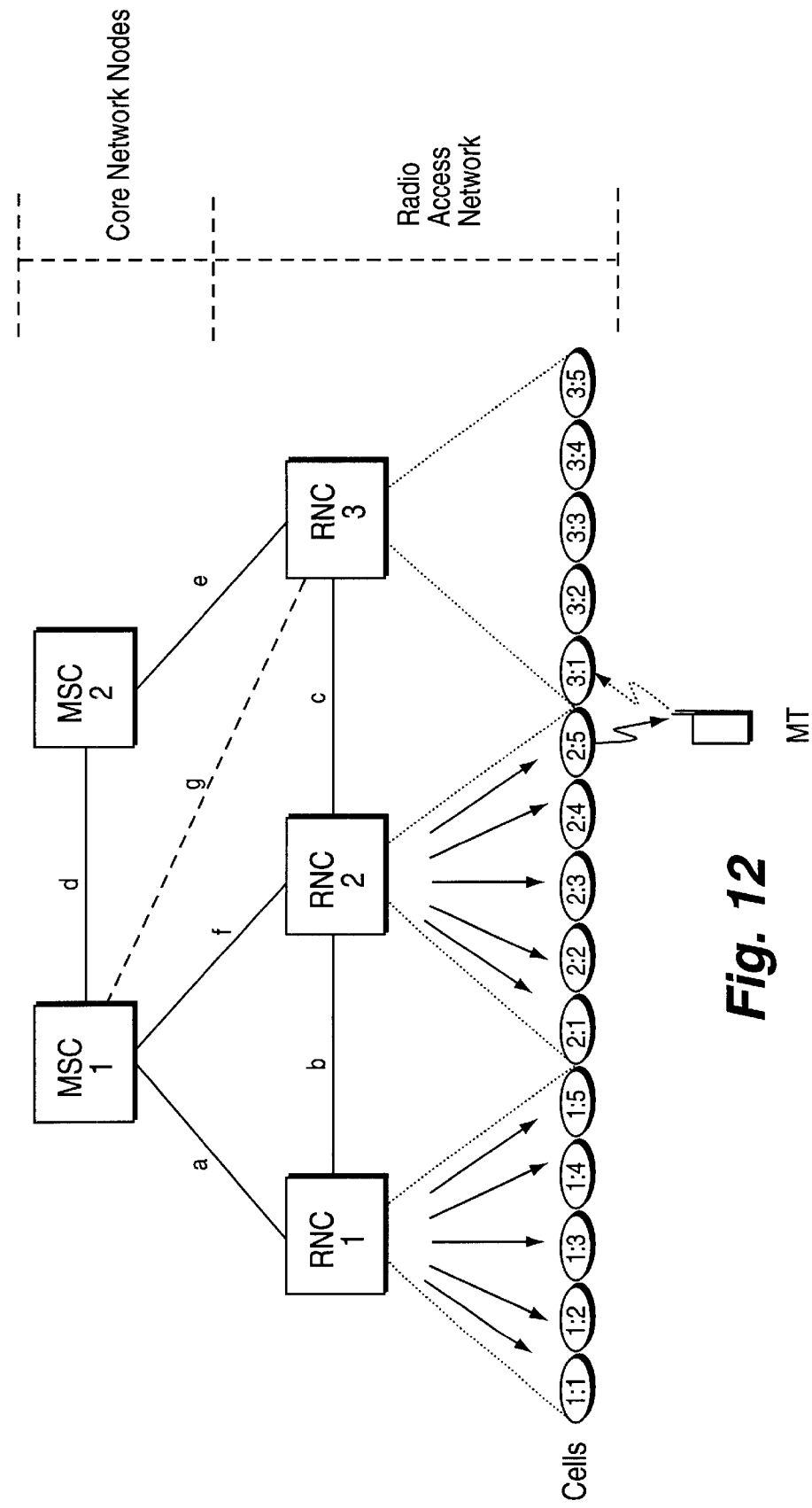
FIG. 12 is another example, non-limiting page/page response scenario in which the present invention is employed.

The invention is readily applied to more complicated routing scenarios. Consider the example illustrated in FIG. 12. Three RNCs are shown with adjacent RNCs communicating via links b and c. RNC 1 controls cells 1:1–1:5; RIC 2 controls cells 2:1–2:5; and RNC 3 controls cells 3:1–3:5. Both RNCs 1 and 2 are coupled to an external core network node, which in this example, is MSC 1 via links a and f, respectively. RNC 3 is coupled via link e to another external core network node, which in this example, is MSC 2. The MSCs are coupled together by link d. The mobile terminal is located at or near the border of cells 2:5 and 3:1.

Figure 13:
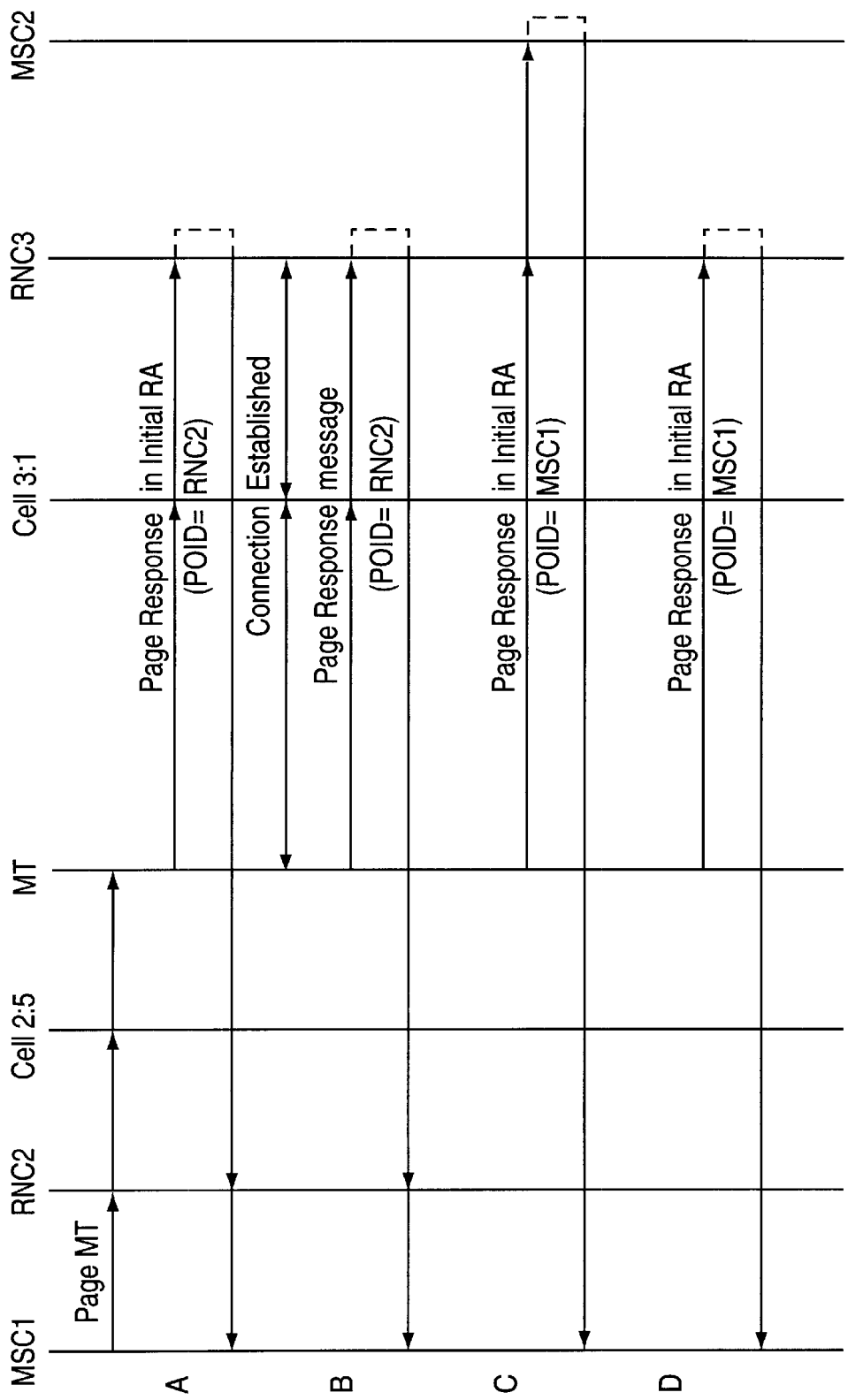
FIG. 13 illustrates four (A–D) signaling diagrams of different example implementations of the invention in accordance with the example shown in FIG. 12.

The page originates from MSC 1, and the mobile terminal is paged in cells 1:1–2:5. While the mobile terminal receives the page in cell 2:5, it responds in cell 3:1. Four example alternatives are illustrated in the simplified signaling diagrams A–D shown in FIG. 13. In diagram A, the paging origination identifier identifies RNC 2. The page response from the mobile terminal in the initial random access message to cell 3:1 includes the RNC 2 identifier. RNC 3 receives that message and re-routes it to RNC 2 via link c. The RNC 2 then forwards the page response via link f to MSC 1.

Alternatively, the page message may not include a paging origination address. Instead, the mobile terminal includes the cell ID of cell 2:5 in the initial random access message. The initial random access message is routed using the cell ID to RNC 2, and the connection is established between RNC 2 and the MT. Then the paging response message is sent from the mobile terminal using the established connection via RNC 2 to MSC 1.

In diagram B, the mobile terminal does not include the paging originator address in the initial random access message. Instead, a connection is established between RNC 3 and the mobile terminal. Thereafter, the mobile terminal sends a paging response message including the paging origination identifier (here identifying RNC 2) to RNC 3. RNC 3 then forwards that message via link c to RNC 2, and RNC2 sends the message to MSC 1 via link f. This scenario is applicable when the mobile terminal receives a page after a connection to RNC 3 is already established.

In signaling diagram C, the mobile terminal paging response to RNC 3 includes a paging origination identifier, which in this example, identifies MSC 1. As the MSC 2 is above RNC 3 in the architectural hierarchy, the page response is routed via link e to MSC 2. The MSC 2 routes the page response to MSC 1 via link d coupling the two MSCs. In signaling diagram D, the paging origination address of the mobile terminal paging response again identifies MSC 1. Although MSC 1 is not above RNC 3, a link g may be provided to couple MSC 1 and RNC 3 if desired. If this is the case, the page response may then be routed by RNC 3 directly to MSC 1 via link g.

Figure 14:
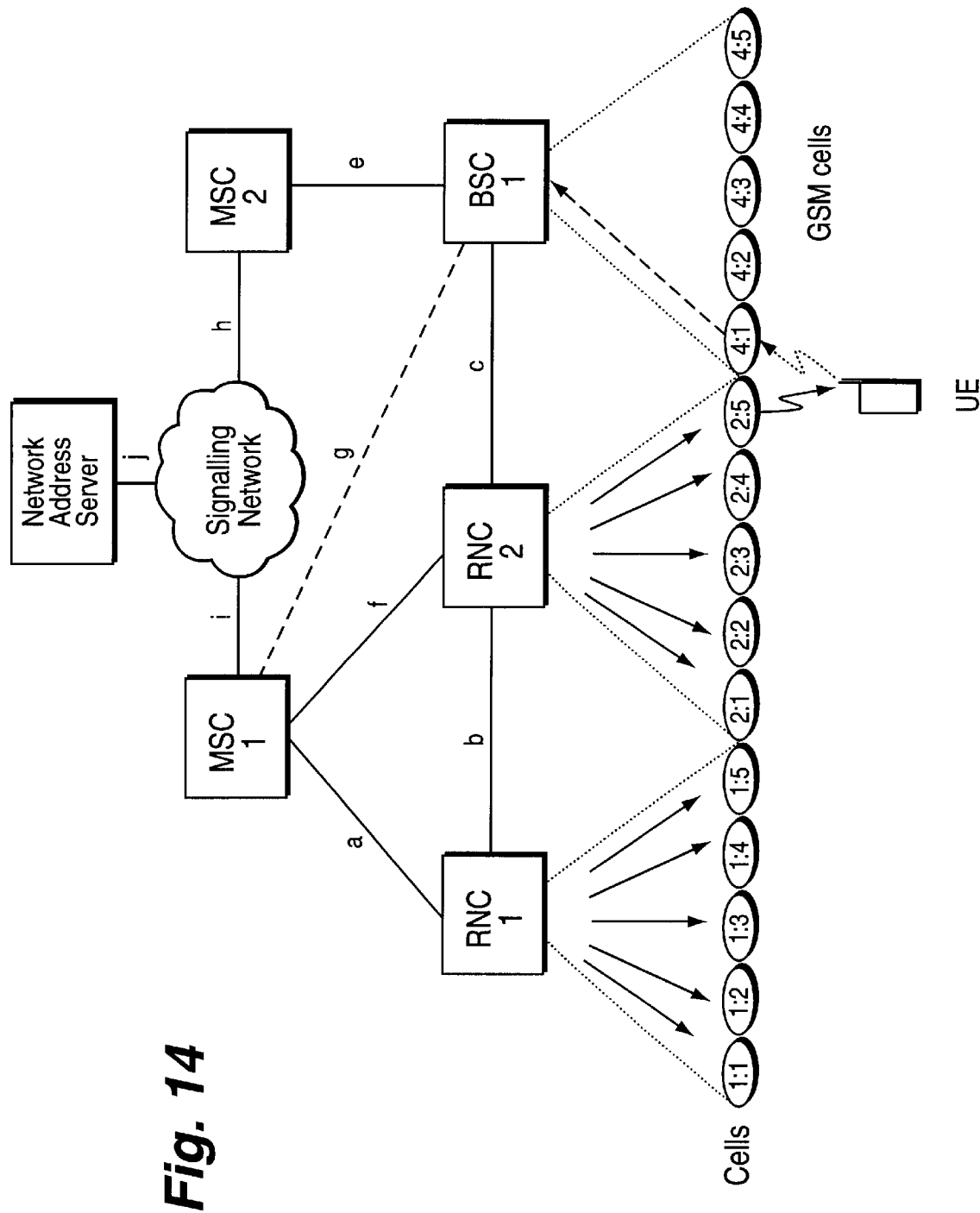
FIG. 14 is yet another example, non-limiting page/page response scenario in which the present invention is employed.

In yet another example, non-limiting application of the invention illustrated in FIG. 14, the mobile terminal receives a page in a cell belonging to one type of radio access system, i.e., a WCDMA based system, in cell 2:5. The mobile terminal then selects a cell 4:1 belonging to another type of mobile communications system, i.e., a GSM system, and establishes a connection with the BSC. In this example, a paging origination identifier identifies MSC 1. A paging response message including the paging origination identifier is sent by the mobile terminal on the established connection and is routed to MSC 1 via MSC 2. In this particular example configuration, MSC 2 consults with a node address server (NAS) using the paging origination identifier and the MT ID. The NAS returns the MSC 1 address which MSC 2 then uses the MSC 1 address to route the paging message by way of the signaling network to MSC 1.

Using the paging origination identifier of the invention in page responses from the mobile terminal offers many advantages. First, the inclusion of the paging origination identifier is simple and does not require separate messages, new communication protocols, or extra signaling. Second, since the mobile terminal does not need to find the optimum cell before it listens to the paging channel for pages, the terminal battery power is conserved. The mobile terminal can listen for pages in a non-optimum cell and at the same time make the necessary measurements to determine a more optimum cell. The paging response can be transmitted from a new, more optimum cell which may even be controlled by another operator or another type of cellular system. Even if that cell is not in the same hierarchical chain of the non-optimum cell where the page was received, the page response can still be routed reliably back to the originating hierarchical chain. Third, and as a result, the number of unsolicited paging responses that are not recognized because they are outside of the originating paging hierarchy is reduced. Fourth, and also as a result, the risk of dropping a connection during the paging response procedure is reduced because the mobile terminal is permitted to find the optimum cell at the time of page receipt and page response transmission. Fifth, the risk of producing extra interference as a result of the higher transmit power level typically required from a non-optimum cell is reduced.

While the present invention has been described in terms of particular examples, those skilled in the art will recognize that the present invention is not limited to those example described and illustrated herein. Different formats, implementations, and adaptations besides those shown and described as well as many modifications, variations, and equivalent arrangements may also be used to implement the invention. Accordingly, it is intended that the invention be limited only by the scope of the claims appended hereto.

What is claimed is:

1. In a mobile radio communications system including a radio network providing communications services to mobile radio terminals over a radio interface, a method comprising:
   paging a mobile terminal in a first area;
   providing an identifier associated with an origination of the page to the mobile terminal;
   receiving a response from the mobile terminal from a second area to the page that incorporates the identifier; and
   using the identifier to route the response an entity that originated the page,
   wherein the page was not transmitted in the second area, the first area corresponding to a first registration area and the second area corresponding to a second registration area.

2. The method in claim 1, wherein the identifier identifies a node in the radio network.

3. The method in claim 2, wherein the node is a serving radio network control node that receives a request to page the mobile terminal from an external network.

4. The method in claim 1, further comprising:
   including the identifier in the page,
   wherein the identifier is a paging area identifier, a registration area identifier, or a network identifier.

5. The method in claim 1, wherein the first area corresponds to a cell, and the identifier is the identity of the cell where the mobile terminal received the page.

6. The method in claim 5, further comprising:
   broadcasting the cell identity to all mobile terminals in the cell over a broadcast channel.

7. The method in claim 1, wherein the response is part of an initial random access message.

8. The method in claim 1, wherein the response is a paging response message.

9. In a mobile radio communications system including a radio network providing communications services to mobile radio terminals over a radio interface, a method comprising:
generating a page for a mobile terminal to be sent to a first area where the mobile terminal is located;
providing to the mobile terminal a paging origination identifier associated with an origin of the page to be used in a response to the page by the mobile terminal from a second area; receiving a page response over the radio interface that includes the paging origination identifier; and
routing the page response toward an originator of the page using the paging origination identifier,
wherein the page was not transmitted in the second area, the first area corresponding to a first registration area and the second area corresponding to a second registration area.

10. The method in claim 9, further comprising:
transmitting the page with the paging origination identifier to the mobile terminal in a first cell;
receiving the page response including the paging origination identifier from the mobile terminal from a second cell; and
routing the page message through the radio network toward an originator of the page using the paging origination identifier.

11. The method in claim 10, wherein the page is transmitted by a first radio network control node associated with a first plurality of cells including the first cell; and
wherein the second cell is one of a second plurality of cells associated with a second radio network control node.

12. The method in claim 11, further comprising:
the mobile terminal responding to the page to the second radio network control using the paging origination identifier, and
the second radio network control node detecting the paging origination identifier, and as a result, routing the paging response to the first radio network control node.

13. The method in claim 11, further comprising:
establishing a connection between the second radio network control node and the mobile terminal; and
transmitting a paging message from the mobile terminal including the paging originator identifier over the connection.

14. The method in claim 13, wherein the paging message is forwarded to the first radio network control node by the second radio network control node based on the paging origination identifier.

15. The method in claim 11, wherein the second radio network control node forwards the paging response to a core network node external to the radio network that originated the page.

16. The method in claim 11, wherein the second radio network control node forwards the paging response to a first external core network associated with the second radio network control node, and
wherein the first core network node forwards the paging response to a second core network node associated with the page origination.

17. The method in claim 11, wherein the paging origination identifier is a paging area identifier, a registration area identifier, or a network identifier.

18. The method in claim 9, wherein the paging origination identifier is the identity of a first cell where the mobile terminal received the page.

19. The method in claim 9, wherein the mobile terminal reselects a cell after receiving the page but before sending a response to the page.

20. In a mobile radio communications system including a radio network providing communications service with mobile terminals over a radio interface, a mobile terminal comprising:
radio circuitry capable of sending and receiving information with the radio network over the radio interface; and
data processing circuitry, coupled to the radio circuitry, configured to detect a page intended for the mobile terminal in a first cell, to determine a page origination identifier, and to send to a second cell via the radio circuitry over the radio interface to the radio network a response to the page that includes the page origination identifier useable to route the response towards an entity that originated the page,
wherein the page was not transmitted in the second cell, the first cell being located in a first registration area and the second cell being located in a second registration area.

21. The mobile terminal in claim 20, wherein the page contains the page origination identifier.

22. The mobile terminal in claim 20, wherein the paging originator identifier is a paging area identifier, a registration area identifier, or a network identifier.

23. The mobile terminal in claim 20, wherein the paging identifier is the identity of the cell in which the page is detected.

24. The mobile terminal in claim 20, wherein the data processing circuitry is configured to send the page response during an initial random access with the radio network.

25. The mobile terminal in claim 20, wherein the data processing circuitry is configured to select a new cell before responding to the page.

26. In a mobile radio communications system including a radio network providing communications services to mobile terminals over a radio interface, a radio network control node, comprising:
data processing circuitry configured to provide a paging origination identifier to a mobile terminal and to generate a page message for the mobile terminal; and
radio circuitry, coupled to the data processing circuitry, for transmitting the page message over a radio interface to a first cell in which the mobile terminal is located and for receiving a paging response message from the mobile terminal transmitted from a second cell which includes the paging origination identifier,
wherein the data processing circuitry is configured to route the paging response message towards an originator of the page using the paging origination identifier, and
wherein the page was not transmitted in the second cell, the first cell being located in a first registration area and the second cell being located in a second registration area.

27. The radio network control node in claim 26, wherein the paging origination identifier is provided to the mobile terminal with the page message.

28. The radio network control node in claim 26, wherein the paging origination identifier is provided to the mobile terminal in some fashion other than with the page message.

29. The radio network control node in claim 26, wherein the paging origination identifier is a cell identification, and the radio circuitry broadcasts the cell identifier to a cell in which the mobile terminal is currently located.

30. The radio network control node in claim 26, wherein the paging origination identifier is a paging area identifier, a registration area identifier, a cell identifier, or a network address.

31. In a mobile radio communications system including a radio network providing communications service with mobile terminals over a radio interface, apparatus comprising:

means for transmitting a page in a first set of one or more cells intended for a mobile terminal; and means for detecting a page response from the mobile terminal received from a cell in a second set of one or more cells that includes a page origination address and directing the page response towards an originator of the page based on the page origination address, wherein the page was not transmitted in the second set of cells, the first set of cells being located in a first registration area and the second set of cells being located in a second registration area.

32. The apparatus in claim 31, wherein the second set of cells belongs to a different network operator than the first set of cells.

33. The apparatus in claim 31, wherein the second set of cells belongs to a different type of mobile communications network than the first set of cells.

34. The apparatus in claim 31, wherein the paging origination address is a paging area identifier, a registration area identifier, a cell identifier, or a network address.

35. The apparatus in claim 31, wherein the paging origination address points to an external network that originated the page.

36. The apparatus in claim 31, wherein the means for transmitting includes the page origination address in the transmitted page.

37. The apparatus in claim 31, wherein the means for transmitting includes the page origination address in a broadcast message other than the page.

* * * * *